United States Patent [19]

Kraus

[11] Patent Number: 4,782,723
[45] Date of Patent: Nov. 8, 1988

[54] TRACTION ROLLER TRANSMISSION

[75] Inventor: Charles E. Kraus, Austin, Tex.

[73] Assignee: Excelermatic Inc., Austin, Tex.

[21] Appl. No.: 115,822

[22] Filed: Nov. 2, 1987

[51] Int. Cl.$^4$ .................... F16H 13/06; F16H 13/10; F16H 15/56; F16H 57/10
[52] U.S. Cl. ........................................ 74/798; 74/772; 74/206; 74/212
[58] Field of Search .................. 74/206, 212, 772, 798

[56] References Cited

U.S. PATENT DOCUMENTS

| | | | |
|---|---|---|---|
| 651,410 | 6/1900 | Ball | 74/798 |
| 1,452,770 | 4/1923 | Webb | 74/772 |
| 1,993,051 | 3/1935 | Dell et al. | 74/212 |
| 2,306,475 | 12/1942 | Wahl | 74/772 |
| 3,349,642 | 10/1967 | Alsch | 74/212 |
| 3,375,739 | 5/1968 | Nasvytis | 74/798 |
| 3,988,950 | 11/1976 | Mori | 74/206 |
| 4,052,915 | 10/1977 | Kraus | 74/798 |
| 4,060,010 | 11/1977 | Hedén | 74/798 |
| 4,078,449 | 3/1978 | Kelly | 74/526 |
| 4,435,998 | 3/1984 | Kinoshita | 74/798 |
| 4,481,842 | 11/1984 | Nelson | 74/798 |
| 4,747,324 | 5/1988 | Perry | 74/798 |

FOREIGN PATENT DOCUMENTS

| | | | |
|---|---|---|---|
| 0016391 | 7/1934 | Australia . | |
| 0494348 | 5/1954 | Italy . | |
| 0003094 | of 1883 | United Kingdom | 74/206 |
| 0004754 | of 1883 | United Kingdom | 74/206 |
| 0297396 | 9/1928 | United Kingdom | 74/798 |

OTHER PUBLICATIONS

Bearings and Rolling Traction, Analysis and Design, by Charles E. Kraus, Excelermatic Inc., Aug. 1987, Austin, Texas 78758.

Primary Examiner—Leslie A. Braun
Assistant Examiner—Harold F. Macris

[57] ABSTRACT

In a planetary type traction roller transmission which comprises a sun, a traction ring and planetary traction rollers disposed in the space between, and in engagement with, the traction ring and the central sun all with somewhat conical traction surfaces so arranged that the tangential axial lines of the traction surfaces intersect in a point on the transmission axis there are provided engaging means for forcing the appropriate traction surfaces into firm engagement with one another but also means for limiting the engagement forces applied to the traction surfaces to a predetermined safe limit which is not exceeded no matter how strong the applied forces are.

6 Claims, 1 Drawing Sheet

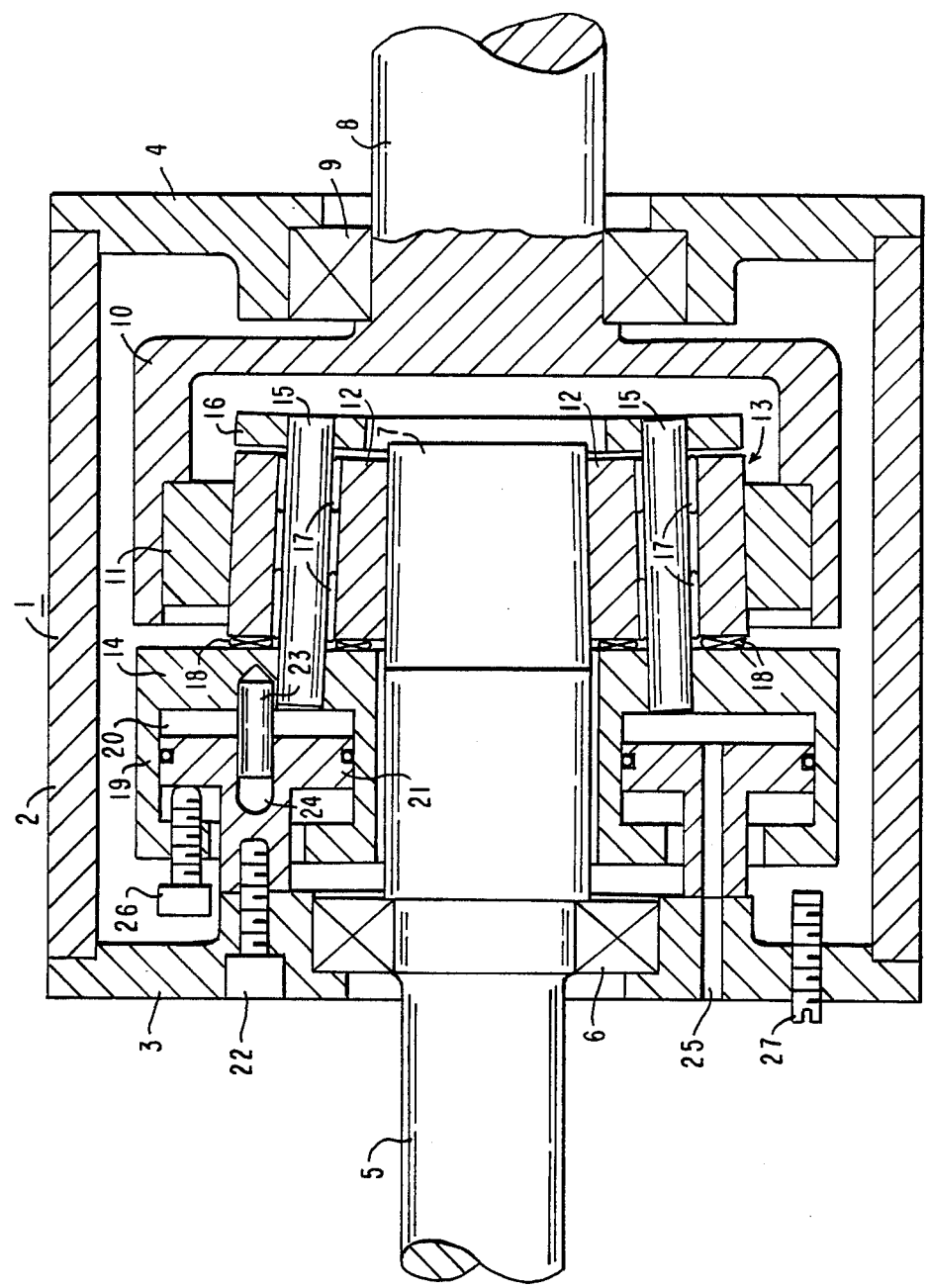

4,782,723

TRACTION ROLLER TRANSMISSION

BACKGROUND OF THE INVENTION

The invention relates to fixed ratio planetary type traction roller transmissions whose traction surfaces are in engagement with each other for the transmission of motion therebetween.

There are generally provided axial cam structures which generate axial forces dependent on the torque transmitted through the transmission and the axial forces so generated are applied to conical race rings or conical sun structures to provide the appropriate traction surface contact forces.

An arrangement in which the traction ring consists of two slightly conical rings which are forced toward each other to engage the traction rollers therebetween is shown for example in U.S. Pat. No. 4,052,915. Applicant's published manuscript "Bearings and Rolling Traction, Analysis and Design" which is available from Excelermatic, Inc., Austin, Tex. 78731, describes and shows in FIG. 20-3a fixed ratio traction roller transmission in which the sun consists of two slightly conical sun sections which are forced toward each other to engage the traction rollers for firm torque-dependent engagement of the traction rollers with the traction ring and the sun structure.

Australian Pat. No. 16,391, Italian Pat. No. 494,348 and U.S. Pat. No. 3,375,739 show planetary type traction roller transmissions including sun rollers, traction rings and planetary traction rollers which are conical and so arranged that their axes and all tangential axial lines of the traction surfaces intersect on the axis of the transmission and means are provided for forcing the planetary rollers into engagement with the suns and the traction rings.

The means providing the engagement forces are generally torque dependent so as to provide the appropriate engagement forces or they are structures which provide fixed forces especially if the torque to be transmitted through the transmission during its operation does not substantially vary.

For generating torque-dependent engagement forces there are usually provided axial cam structures or there may be provided hydraulic engagement force generating means which require a pressurized fluid control structure in order to supply the appropriate engagement forces.

Both arrangements are expensive. There are however certain applications, for example, in torpedo drives, where a traction roller transmission is advantageous because of its quiet operation but where costs should also be maintained as low as possible since the transmission is destroyed with the actual use of the torpedo. A preload corresponding to the maximum torque which can be achieved very inexpensively would also be quite adequate since a torpedo transmission is operated only for a short time and during all that time essentially at a predetermined torque.

Torpedoes however are stored for long periods of time until they are actually used and keeping the transmission's traction surfaces under the preload as required for operation will, in time, cause denting and corrosion of the traction surfaces which results in noisy operation or even failure.

Transmissions of the above type have relatively small cone angles in order to avoid the need for large axial engagement forces and therefore they require relatively large axial travel for the engagement member—when forced toward the other members, for example by a hydraulic piston—from a contact force-free position to a position in which the appropriate contact forces as needed for the transmission of the needed torque are generated.

Also inappropriately large forces applied to the engagement member may damage the rollers' traction surfaces because the relatively small cone angles translate the engagement forces in large surface contact pressures. It is therefore the principal object of the present invention to provide a transmission whose traction rollers have relatively small cone angles in order to be able to be operated by only small axial engagement forces but which nevertheless can be operated by any available force generating structure without the danger of damage to the traction surfaces. It is also desirable that, in spite of the relatively small cone angles of the traction surfaces, only a relatively small amount of axial movement is required for the achievement of the required traction roller surface engagement.

SUMMARY OF THE INVENTION

This object is achieved wtih a planetary type traction roller transmission which comprises as traction elements a sun, a traction ring and planetary traction rollers disposed in the space between, and in engagement with, the traction ring and the central sun, all being so arranged that the tangential axial lines of the traction surfaces intersect in a point on the transmission axis; there are provided means for applying axial forces to the traction elements to cause their engagement with one another but there are also provided means to adjustably limit the application of such axial engagement forces to predetermined safe values in order to prevent traction surface loading beyond what is needed to transmit maximum torque.

With this arrangement any available force generating means such as available pressurized fluid may be utilized to provide the engagement forces and the pressure does not need to be limited since the transmission includes means for limiting the application of such forces.

In a preferred embodiment there are also provided means for limiting disengagement movement of the traction elements to avoid full disengagement, that is, to maintain certain engagement forces which however should be small enough so as to prevent damage to the traction element surfaces even if a transmission remains unused over a long period of time.

BRIEF DESCRIPTION OF THE DRAWINGS

The single FIGURE is a cross-sectional view of a planetary type traction roller transmission according to the invention.

DESCRIPTION OF THE PREFERRED EMBODIMENT

The traction roller transmission as shown in the FIGURE includes a housing 1 having a cylindrical portion 2 with end walls 3 and 4 at opposite ends thereof. An input shaft 5 is rotatably supported in end wall 3 by a bearing 6 and has a sun roller section 7 with a slightly conical surface formed at its end within the housing 1. An output shaft 8 is rotatably supported in the end wall 4 by a bearing 9 and carries a traction ring structure 10 within the housing 1. The traction ring structure 10 includes a slightly conical traction ring 11 surrounding the sun roller section 7 in spaced relationship. Slightly conical traction rollers 12 are supported in the annular space 13 between the traction ring 11 and the sun roller section 7 by a carrier 14 and are in motion transmitting engagement with both the sun roller section 7 and the traction ring 11 for the transmission of motion therebetween.

The slightly conical surfaces have cone angles and are arranged such that the axial tangents to the slightly conical surfaces all coincide in a single point on the axis of the input and output shafts 5, 8 so that spin on the torque transmitting traction surfaces is avoided.

The carrier 14 has support shafts 15 extending through the traction rollers 12 and the support shafts 15 are interconnected by a support ring 16 mounted to their free ends, the traction rollers 12 being supported on the support shafts 15 by needle bearings 17. Axial thrust bearings 18 are arranged between the carrier 14 and the traction rollers 12 in order to provide the axial engagement forces to the traction rollers 12 for forcing them into the space 13 between the ring 11 and the sun roller section 7.

In order to provide the axial thrust forces the carrier 14 is provided with an annular cylinder 19 having an annular cylinder cavity 20 in which an annular piston 21 is disposed. The piston 21 is mounted to the end wall 3 by bolts 22 and slide pins 23 are mounted into the carrier 14 and extend into bores 24 in the piston 21 such that the carrier 14 is axially movable but not rotatable relative to the piston 21.

A hydraulic fluid supply passage 25 extends through the end wall 3 and through the piston 31 for supplying pressurized fluid to the annular cavity 20 for forcing the cylinder 19 toward the traction ring structure 10 and the conical traction rollers 12 into the annular space 13 between the traction ring 11 and the sun roller section 7 for firm engagement therewith.

Such engagement movement of the cylinder 19 however is adjustably limited by adjustment screws 26 which are adjusted to provide appropriate roller engagement forces for the maximum torque transmitted through the transmission no matter how large the pressure of the pressurized fluid supplied to the cylinder cavity 20 is.

There is also provided in the end wall 3 an adjustment screw 27 which limits the disengagement movement of the planetary roller carrier 14 to an adjustable desired degree.

With such an arrangement the traction rollers may be kept in a relatively low force engagement position as determined by the adjustment screw 27 in which no damage occurs to the traction surfaces even over long periods of time and full engagement forces are limited by the adjustment screws 26. The usually available high pressure fluid may then simply be admitted to the cylinder cavity when full engagement forces are needed for operation of the transmission but in spite of the high pressure of the fluid the traction surfaces are not overloaded but engagement pressures are limited to a preadjusted value.

LISTING OF REFERENCE NUMERALS

1 Housing
2 Cylindrical portion
3 End wall
4 End wall
5 Input shaft
6 Bearing
7 Sun roller section
8 Output shaft
9 Bearing
10 Traction ring structure
11 Traction ring
12 Traction roller
13 Annular space
14 Carrier
15 Shaft
16 Traction ring
17 Needle bearing
18 Axial thrust bearing
19 Annular cylinder
20 Annular cylinder cavity
21 Annular piston
22 Bolt
23 Sliding pin
24 Bore
25 Fluid supply passage
26 Adjustment screw
27 Adjustment screw

What is claimed is:

1. A planetary type traction roller transmission comprising a housing having coaxial input and output shafts supported therein rotatably about a central transmission axis and disposed in said housing traction elements including a sun associated with one of said shafts, a traction ring concentric with, but spaced from, said sun and being mounted on the other of said shafts and motion transmitting planetary type traction rollers rotatably supported in the space between said sun and said traction ring, said sun, said traction rollers and said traction ring all having, with respect to their axes, somewhat conical traction surfaces and also being so disposed in said housing that the tangential axial lines of all said traction surfaces intersect in a point on the axis of said transmission, and said traction rollers being supported on an axially movable carrier having engaging means associated therewith for forcing it toward the other traction elements to provide for engagement forces with the traction elements for the transmission of motion therebetween, said engagement means having adjustable members associated therewith for limiting the engagement forces to a predetermined value corresponding to the largest torque to be transmitted through the transmission.

2. A planetary type traction roller transmission according to claim 1; wherein said axially movable carrier includes a cylinder and piston structure, one formed on said carrier and the other mounted on said housing and a fluid passage extends through said housing and into said cylinder for supplying pressurized fluid to said cylinder to provide said engagement forces.

3. A planetary type traction roller transmission according to claim 2, wherein said cylinder is formed on said carrier and said piston is mounted on said housing and said fluid passage extends through said piston.

4. A planetary type traction roller transmission according to claim 3, wherein said cylinder and piston are annular and said carrier has pins projecting therefrom axially into openings in the piston to prevent rotation of the cylinder relative to the piston.

5. A planetary type traction roller trnamission according to claim 3, wherein said adjustable members for limiting the engagement forces are adjustment screws threaded into said cylinder and adapted to abut said piston to limit the movement of said cylinder relative to said piston under the forces of said pressurized fluid.

6. A planetary type traction roller transmission according to claim 3, wherein an adjustable screw is mounted in said housing adjacent said cylinder and is adapted to abut said cylinder so as to adjustably limit roller disengagement movement of said cylinder and the planetary traction rollers associated therewith.

* * * * *